US010906243B2

(12) United States Patent
Silvestro

(10) Patent No.: US 10,906,243 B2
(45) Date of Patent: Feb. 2, 2021

(54) ADDITIVE LATHE THAT PRINTS IN CYLINDRICAL COORDINATES

(71) Applicant: Elizabeth Silvestro, Philadelphia, PA (US)

(72) Inventor: Elizabeth Silvestro, Philadelphia, PA (US)

(*) Notice: Subject to any disclaimer, the term of this patent is extended or adjusted under 35 U.S.C. 154(b) by 291 days.

(21) Appl. No.: 15/952,606

(22) Filed: Apr. 13, 2018

(65) Prior Publication Data

US 2018/0297280 A1    Oct. 18, 2018

Related U.S. Application Data

(60) Provisional application No. 62/485,385, filed on Apr. 14, 2017.

(51) Int. Cl.
*B23Q 3/06*    (2006.01)
*B25B 5/00*    (2006.01)
(Continued)

(52) U.S. Cl.
CPC .......... *B29C 64/241* (2017.08); *B23Q 3/067* (2013.01); *B23Q 3/088* (2013.01); *B25B 11/005* (2013.01); *B29C 31/042* (2013.01); *B29C 31/044* (2013.01); *B29C 31/045* (2013.01); *B29C 31/047* (2013.01); *B29C 33/448* (2013.01);
(Continued)

(58) Field of Classification Search
CPC .......... B23Q 3/06; B23Q 3/067; B23Q 3/088; B23Q 2703/02; B23Q 2703/04; B25B 5/00; B25B 11/005; B29C 31/042; B29C 31/044; B29C 31/045; B29C 31/047; B29C 33/44; B29C 33/448; B29C 33/50; B29C 33/52; B29C 64/118; B29C 64/188;
(Continued)

(56) References Cited

U.S. PATENT DOCUMENTS

2012/0165969 A1* 6/2012 Elsey .................... B29C 64/112
                                                    700/120
2016/0096323 A1* 4/2016 Fry ....................... B29C 64/245
                                                    264/308

(Continued)

FOREIGN PATENT DOCUMENTS

SU             1444116 A   * 12/1988   ............. B23K 37/04

*Primary Examiner* — Leo B Tentoni
(74) *Attorney, Agent, or Firm* — Schwegman Lundberg & Woessner, P.A.

(57) ABSTRACT

An additive lathe integrates the advantages of additive manufacturing (also called 3d printing) with the cylindrical motion of a lathe to reduce material waste, print times, and increase creative potential. A post-processing system allows for an improved surface finishing on parts. The additive lathe no longer prints in cartesian (X, Y, Z) coordinates as other 3D printers and instead prints using cylindrical (R, Theta, Z) coordinates. The traditional bed or build plate is replaced with a horizontal cylindrical starter bar, on which 3D printed material is deposited along and around the bar. Essentially, the additive lathe works like a conventional lathe, but in reverse. Instead of taking a cylinder and slowly removing material as the part spins, the additive lathe adds material along and around the bar iteratively building up the part. The finishing mechanism allows for the creation of a smooth outer finish on printed parts while still in the printer.

17 Claims, 7 Drawing Sheets

(51) Int. Cl.

| | |
|---|---|
| *B29C 33/44* | (2006.01) |
| *B29C 33/50* | (2006.01) |
| *B29C 33/52* | (2006.01) |
| *B29C 64/241* | (2017.01) |
| *B29C 64/188* | (2017.01) |
| *B33Y 30/00* | (2015.01) |
| *B29C 31/04* | (2006.01) |
| *B23Q 3/08* | (2006.01) |
| *B33Y 40/20* | (2020.01) |
| *B29C 64/209* | (2017.01) |
| *B29C 64/245* | (2017.01) |
| *B25B 11/00* | (2006.01) |
| *B29C 64/118* | (2017.01) |
| *B33Y 10/00* | (2015.01) |

(52) U.S. Cl.
CPC .......... *B29C 64/188* (2017.08); *B29C 64/209* (2017.08); *B29C 64/245* (2017.08); *B33Y 30/00* (2014.12); *B33Y 40/20* (2020.01); *B23Q 2703/02* (2013.01); *B23Q 2703/04* (2013.01); *B29C 64/118* (2017.08); *B33Y 10/00* (2014.12)

(58) Field of Classification Search
CPC ... B29C 64/209; B29C 64/241; B29C 64/245; B33Y 10/00; B33Y 30/00; B33Y 40/20
USPC ........ 264/234, 308, 310, 313, 317; 425/135, 425/145, 375, 376.1, 377, 404, 436 R, 425/471; 269/20, 57
See application file for complete search history.

(56) References Cited

U.S. PATENT DOCUMENTS

2016/0121555 A1* 5/2016 Kunc ..................... B29C 33/52
264/219
2016/0339634 A1* 11/2016 Fuller .................. B29C 64/209

* cited by examiner

ADDITIVE LATHE THAT PRINTS IN CYLINDRICAL COORDINATES

CROSS-REFERENCE TO RELATED APPLICATIONS

This application claims priority under 35 U.S.C. § 119 to U.S. Provisional Patent Application No. 62/485,385 filed Apr. 14, 2017. The contents of that patent application are hereby incorporated by reference.

TECHNICAL FIELD

This application is directed to an additive lathe that prints using cylindrical (R, Theta, Z) coordinates. Instead of taking a cylinder and slowly removing material as the part spins as with a traditional lathe, the additive lathe adds material iteratively to build up a part.

BACKGROUND

Fused deposition modeling (FDM) was commercialized in the 1990s and is considered to be a groundbreaking technology in the field of additive manufacturing. Since that time, there has been an explosion of exploration in the additive manufacturing field. From expanding material options to improving accuracy and cost, the field has been rapidly developing.

However, there are still technology areas in the field of additive manufacturing that could use improvement. Some key limitations in additive manufacturing technology at present include complex curves and part orientation. Both aspects are related to the idea that FDM is essentially a stacking of 2.5D slices. In the flat X-Y slices, curved models are seen to experience a lack of precision due to approximation by the computer and the mechanical limitations in motion. These effects are not only accumulated with the addition of layers in the Z-axis but are compounded by the staircase and containment effect. The staircase effect is the stepped edges caused by the stacking of 2.5D contours, and the containment problem that each slice is either an under or overestimation of the slice and never the exact curve.

Recent developments have focused on creating ever more complex geometries. For example, as depicted in FIG. 1, in order to create a part with a complex shape similar to that of Model M, the added support structure labeled S must be printed as well to create Model T, which adds time and material costs to a print. Some higher end machines have dissolvable support material that can be removed during post processing but such techniques are only minimally implemented in consumer level machines. Even with support capability, there are still drawbacks on post processing methods. For example, many methods require that the support be exposed to allow for acid to dissolve it or for a water jet to wear it.

The designs on the market to date relating to curvature and material supporting tend to focus on one area at a time by improving such aspects as the extruder head, software, or the plate rotation. For example, DeltaBot unitizes the capability of a delta robot to move the extruder head around the printing space. A delta robot is a parallel robot consisting of three arms controlled by rotatory joints as the top of the machine. This technology aims to improve the motion of the head along curvatures; however, it still contains the errors of the staircase effect and requires support for particularly complicated geometries. On the other hand, several new machines in the consumer level have begun to offer dual extrusion technology to allow the machines to print two materials at the same time. The print head can switch between a material head and a support head during a mint to allow the option of a dissolvable support. However, though dual printing allows the support to be printed it does not attempt to consider any of the curvature issues of a print. Also, several algorithms have been implemented on machines to help improve the accuracy of prints. Key areas of focus have been the approximations made in a part slicer, simplifications of support material, and extruder head motion planning. Unfortunately, all of these improvements are limited to the hardware they are implanted on. Thus, there is a clear need in the additive manufacture art for a printer that addresses both the challenges of complex curvature and support reductions.

Prior art approaches in additive manufacturing that partially address the challenges of complex curvature and support reductions are compared below.

Delta Printer

The delta robot was originally designed for handling and manufacturing applications. In a three-axis delta robot, each axis is connected directly to the faceplate. The movement of these three axes (either one or a combination of all three) will move the faceplate in Cartesian coordinates. Traditionally, a gripper is attached to the faceplate for the grabbing and moving of pieces. A recent modification has been to add an extruder head to the plate to allow the delta robot to chive the motion about the plate. Delta robots are capable of moving up to 10 meters per second, which allows for a motion around a curved area to be significantly smoother than that of a traditional pulley system. Although the delta robot provides substantial improvements to speed and motion about curves, this system still fails to address many of the pitfalls of standard consumer printers. For example, the improvements on the curves on limited to the slice level. Thus, a printed vase on this system would have enhanced circular slices but would still have a stair-step effect along the Z-axis. In addition, models with vertical overhangs still require some form of support.

Polar Plate

Polar printers are a relatively new concept to address how printers move. This system utilizes a sliding and rotating building plate to print. The extruder merely moves up and down on the Z axis, and the rest of the "X-Y" movements are handled by the rotation and movement of the circular build plate. This system aims to improve the speed and fluidity of the minting by removing the belts system. However, as with the delta printer, this system still faces many of the same problems as traditional printers. The fluidity of the print head can only help to improve circularity on the slice level. With respect to the Z axis, parts still experience the stairstep effect and require vertical support.

Dissolvable Support

When focused on the need to support vertical overhang, many machines provide a form of dissolvable support material. During printing, the machine switches heads to lay down either a support or a model material. The part is then taken from the machine and placed in a bath to dissolve away the support material leaving the model. This method solely focuses on allowing for vertical supporting of parts such as a dumbbell, as shown in FIG. 2. Even with this, the parts are limited to geometries where the support is exposed for the bath to be able to reach and dissolve it.

Inverted SLA

Stereolithography (SLA) is an alternative to FDM printing. SLA is the process of solidifying a part point by point and drawing it out from a vat of liquid material. SLA is generally an expensive process. Inverted SLA machines have been developed to reduce the price. Inverting means that the part is created upside down as the plate moves upward away from a small bath of material. SLA offers a point accuracy of 140 microns and a layer height one-fourth that of comparable FDM machines. The higher accuracy produces parts with enhanced curvatures and surface quality. However, due to the need to invert the system, it requires more strength in supports and the base to hold parts. This requirement limits the part's size and balance. Also, parts with multiple materials are not an option on SLA because there is not a way to control material in the bath.

Heated Plate

The most common method to improve part removal and part adhesion is a heated bedplate. Heat beds work to prevent a warping effect by keeping the part warm during the whole printing process to ensure that the part remains flat on the print bed. The improved adhesion allows leveling to loosen a part to make final part removal easier.

Lathe

In contrast to additive manufacturing, the traditional mill functions with a Cartesian coordinate system for part manufacturing. However, for parts with complex curvatures or cylindrical features, traditional milling also faces the challenge of requiring integrated fixtures or holding methods. A lathe shapes wood, metal, or other material by means of a rotating drive that turns the piece being worked on against changeable cutting tools. The lathe was invented to meet the need for a machine to create parts with properties ideal for cylindrical coordinates. However, the lathe conventionally operates to subtract material from the part as it is being rotated.

Prior Art Summary additive lathe machine results that is ideal for printing parts with properties ideal for cylindrical coordinates such as a chess piece, a bat, or even a threaded screw.

In sample embodiments of an additive lathe, a vertical extruder head laying material on a starter bar incrementally rotating forms parts of higher circularity by relying on the rotation of the part rather than a pulley system. Parts that would traditionally require vertical supports would not require supports in this layout due to the shill in how the part is placed (the old z axis is now horizontal). Also, the addition of a starter bar system improves part removal in that the part is printed on a bar that can be unclamped at the end to remove the need for scraping. The resulting system greatly improves the quality of round and cylindrical parts made using additive (3D) printing techniques.

In sample embodiments, a 3D printer is provided with an additive lathe that creates a part from a pattern provided in cylindrical coordinates. In sample embodiments, the additive lathe includes a blank of round stock, an extruder, a motor rig having a theta axis stepper that controls rotation of the blank around a theta axis, a z axis stepper that controls movement of the extruder in a z axis direction, and at least one radial axis stepper that controls movement of the extruder in a radial axis direction along the blank as the blank is rotated by the theta axis stepper. The operation of the theta axis stepper, z axis stepper, at least one radial axis stepper, and extruder are controlled by a processor to apply extruder material to the blank in a pattern provided in cylindrical coordinates to create a part. In sample embodiments, the blank is formed of thermoplastics or metal stock or may be formed of a dissolvable material. In other embodiments, a sleeve placed over the blank and beneath any applied extruder material, and the sleeve is adapted to

|  | Circularity | Vertical Support (ex. Dumbbell) | Part Removal | Multi-material |
| --- | --- | --- | --- | --- |
| Delta Printer | Improved on the slice level but lost in Z axis | Vertical overhangs would require supports | Cold removal with scraper | Limited to number of heads |
| Rotational Plate | Improved on the slice level but lost in Z axis | Vertical overhangs would require supports | Cold removal with scraper | Limited to number of heads |
| Dissolvable support | No improving on circles | Support removed post processing | Cold removal with scraper | Limited to number of heads |
| Inverted SLA | Finer approximation on circle but still Polygons | Vertical overhangs would require supports and could have weight issues | Wedge removal with scraper | No, One material tank |
| Heated plate | No improving on circles | Vertical overhangs would require supports | Hot removal-less scraper | Limited to number of heads |
| Lathe | Improve circles with rotational motion and bending | Supports not required for parts with vertical overhang | Unclamp the starter bar | Limited to number of heads |

Each of the prior art approaches as summarized in the above table has significant limitations in addressing the challenges of complex curvature and support reductions for additive manufacturing techniques. Thus, there remains a significant need for techniques for additive manufacturing that would address these needs in the art.

SUMMARY

The systems and methods described herein address the above-mentioned needs in the art by integrating the traditional lathe and fused deposition modeling (FDM) manufacturing processes. By blending these technologies, an facilitate removal of the part from the blank once the part has been completed. Also, a heating device may also be provided that is disposed adjacent to the blank to apply heat to the extruder material as the blank is rotated by the theta axis stepper around the theta axis so as to create a smooth outer finish on the part before the part is removed from the blank.

In sample embodiments, the extruder is carried by an extruder carriage that is disposed on two sliding bars and adapted to move in the z axis direction using a pulley system controlled by the z axis stepper. The extruder carriage also may be supported by the at least one radial axis stepper and connected to a lead screw that drives the extruder carriage up and down in the radial axis direction.

In other sample embodiments, the motor rig comprises an adjustable chuck attached to the theta axis stepper that holds the blank for working by applying radial symmetry clamping. The adjustable chuck may include jaws, a threaded drill head, and vacuum suction to secure the blank for working. The motor rig may also include a supporting and centering device comprising an adjustable dead center that supports the blank at an end of the blank opposite the adjustable chuck and ensures concentricity and dampens vibration with a fixed (dead) or a rotating (live) end. Alternatively, the motor rig may comprise a collet-radial symmetry clamp that holds the blank in place for working using collar compression.

The system described herein may also be used to implement methods of additive printing. In sample embodiments, such methods include placing a blank of round stock into a motor rig having a theta axis stepper that controls rotation of the blank around a theta axis, applying extruder material to the blank under control of a z axis stepper and at least one radial axis stepper that together control movement of an extruder in a z axis direction and a radial axis direction along the blank as the blank is rotated by the theta axis stepper, and controlling operation of the theta axis stepper, z axis stepper and at least one radial axis stepper to apply the extruder material to the blank in a pattern provided in cylindrical coordinates to create a part. In some embodiments, the methods may include the step of coveting the blank in a sleeve material prior to applying the extruder material and removing the sleeve from the blank once the part comprising the pattern has been completed. The part may be finished in some embodiments by rotating the part over a heating device to create a smooth outer finish on the part before the part is removed from the blank.

Sample embodiments of the methods described herein may be used to form parts having different patterns. For example, the pattern may be a ring and controlling operation of the theta axis stepper, z axis stepper and at least one radial axis stepper to apply the extruder material to the blank comprises incrementing the theta axis stepper to rotate around the theta axis, then incrementing the z axis stepper to move in steps in the z axis direction, and then incrementing the at least one radial axis stepper a step in the radial axis direction as the extruder material is applied to the blank. In another example, the pattern may be a line and controlling operation of the theta axis stepper, z axis stepper and at least one radial axis stepper to apply the extruder material to the blank comprises incrementing the z axis stepper to move in steps in the z axis direction, then incrementing the theta axis stepper to rotate in steps around the theta axis, and then incrementing the at least one radial axis stepper a step in the radial axis direction as the extruder material is applied to the blank. In yet another example, the pattern may be a bidirectional pattern and controlling operation of the theta axis stepper, z axis stepper and at least one radial axis stepper to apply the extruder material to the blank comprises simultaneously incrementing the theta axis stepper to move in steps around the theta axis and the z axis stepper to move in steps in the z axis direction to create a curved extrusion layer about the blank.

BRIEF DESCRIPTION OF THE DRAWINGS

The present disclosure is illustrated by way of example and not limitation in the figures of the accompanying drawings, in which like references indicate similar elements and in which:

FIG. 3 illustrates respective views of a motor rig in a sample embodiment

FIG. 4 illustrates respective views of a starter bar in a sample embodiment.

DESCRIPTION

Figure 1:
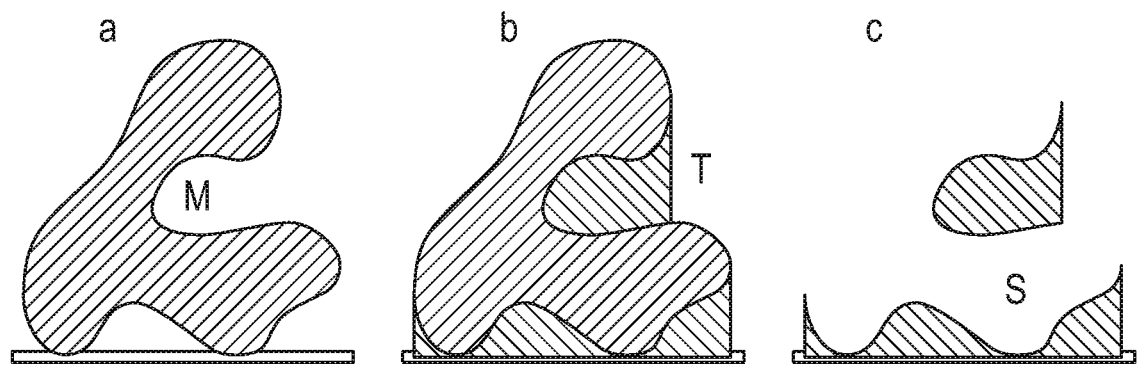
FIG. 1 illustrates a part with a complex shape M that requires a support structure S to be printed as well, which adds time and material costs to a mint.
Figure 2:
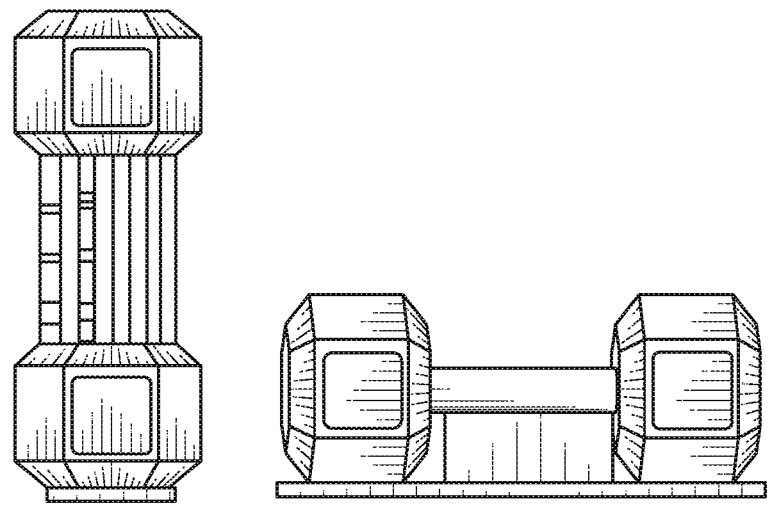
FIG. 2 illustrates a dumbbell created using 3D printing by using a dissolvable support that vertically supports parts of dumbbell until dissolved.
Figure 3A:
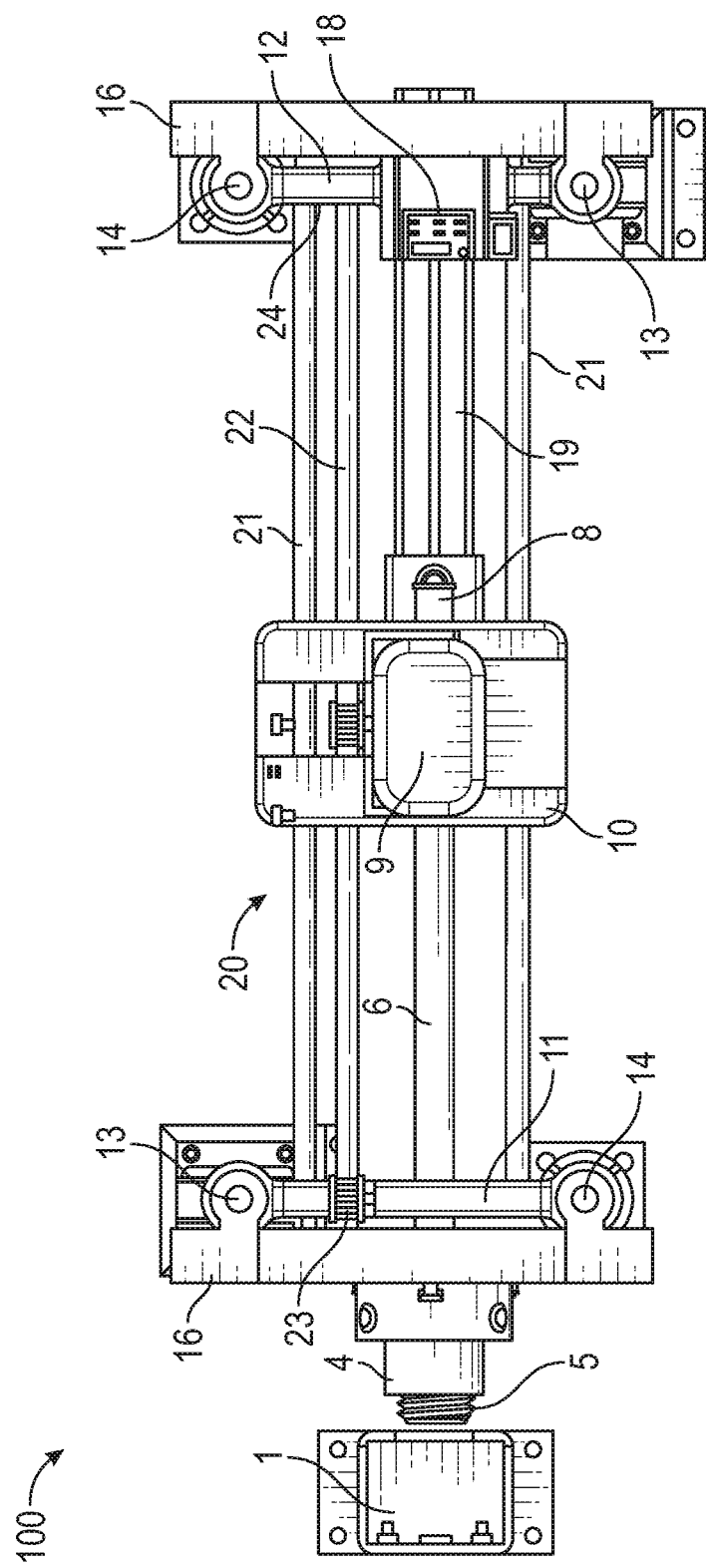
FIG. 3A illustrates a top view.
Figure 3B:
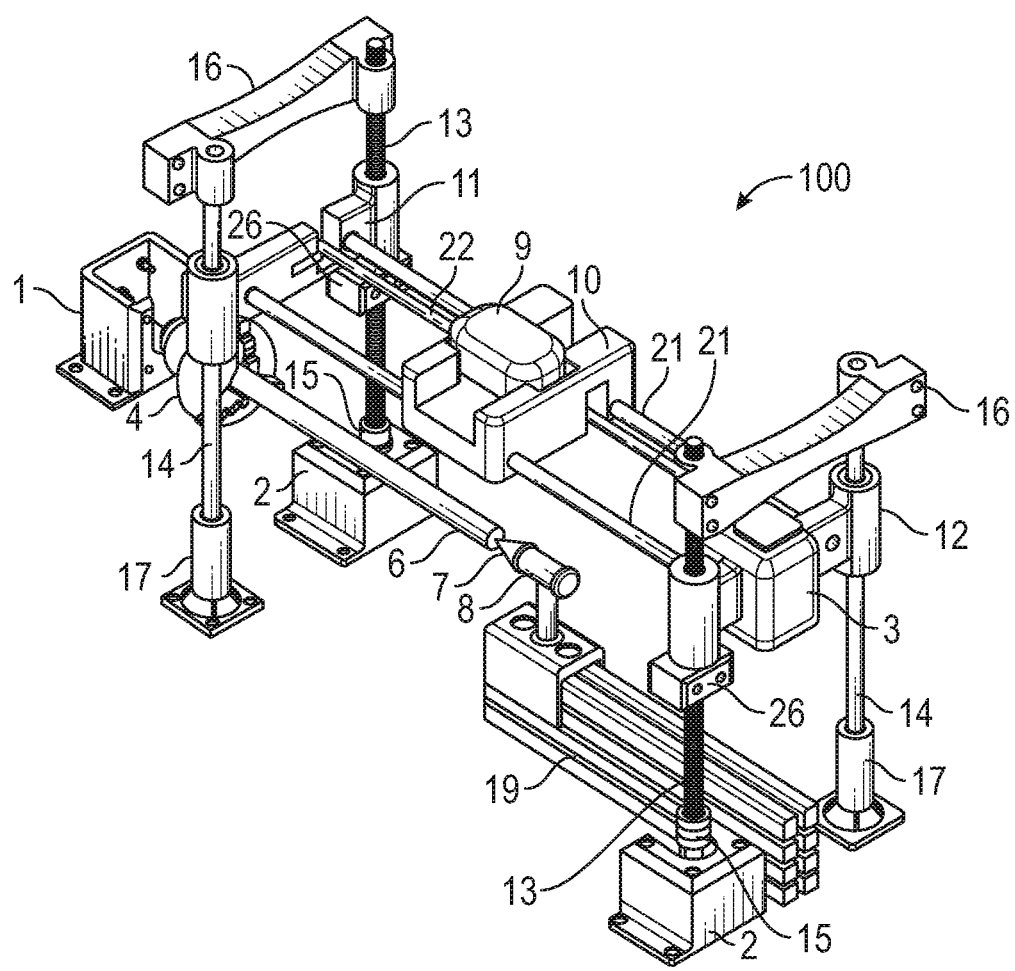
FIG. 3B illustrates a perspective view.
Figure 3C:
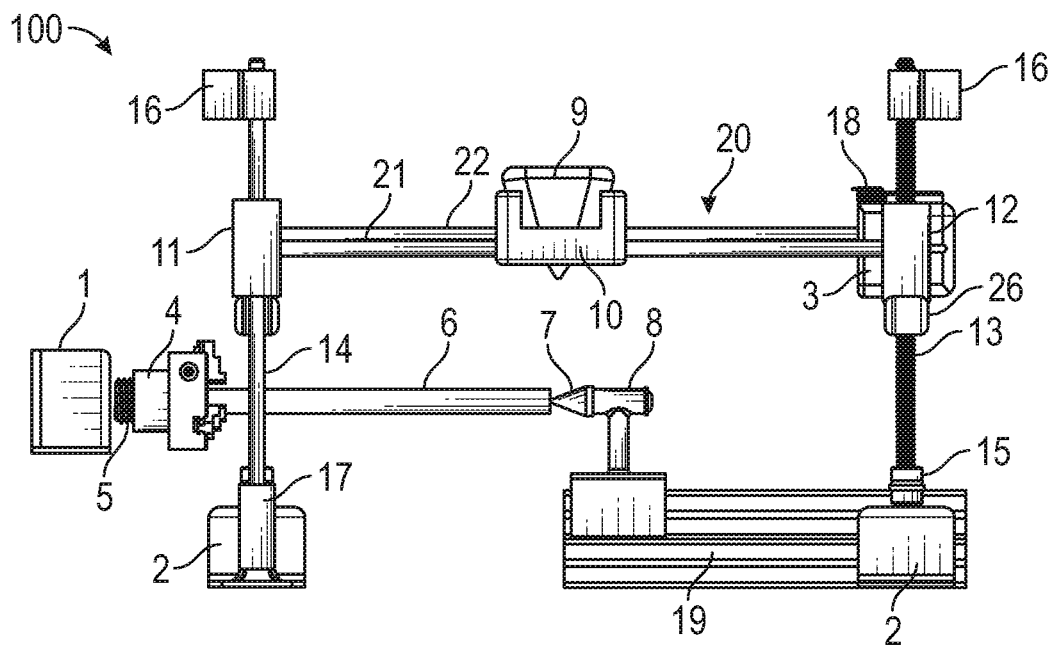
FIG. 3C illustrates a side view.
Figure 3D:
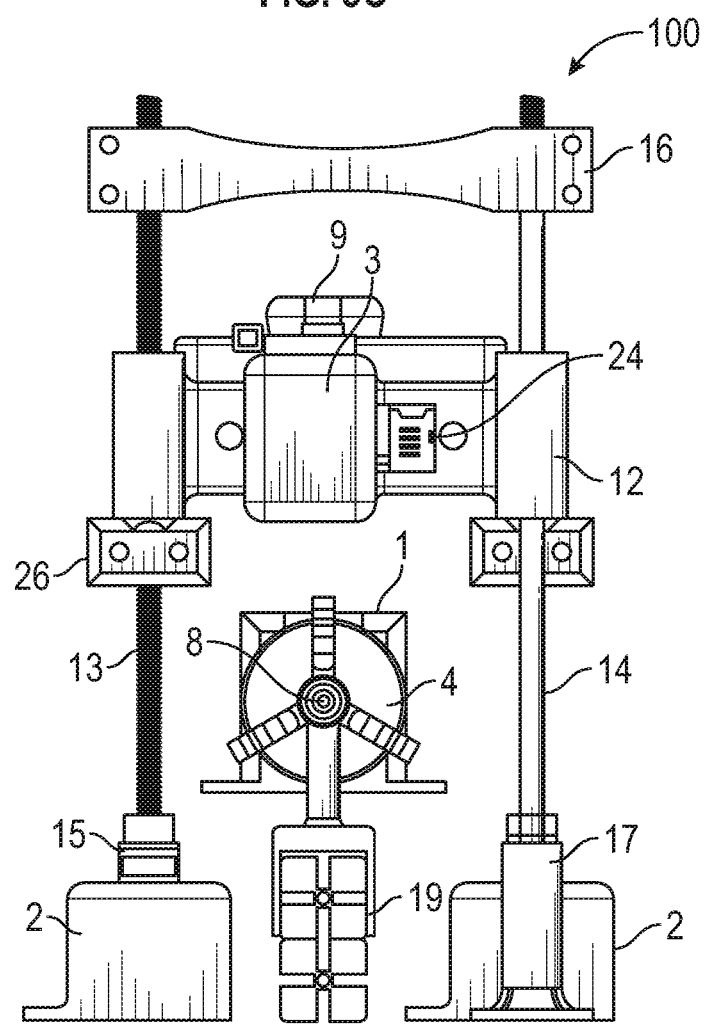
FIG. 3D illustrates a right end view.

The following description with respect to FIGS. 3-6 sufficiently illustrates specific embodiments to enable those skilled in the art to practice them. Other embodiments may incorporate structural, logical, process, and other changes. Portions and features of some embodiments may be included in, or substituted for, those of other embodiments. Embodiments set forth in the claims encompass all available equivalents of those claims.

As noted above, the current state of additive manufacturing is limited by geometrical approximations and excessive material use. Consumer-level 3D printers approximate circular objects as many-sided polygons, slice CAD models using triangular approximations, and require copious support material to create objects with overhang. The systems and methods described herein address these issues in one autonomous solution. The system described herein operates much like a lathe, but builds a part up additively upon a round stock instead of cutting away from it. Also, by printing in cylindrical coordinates, much higher circularity is possible and little or no support material is needed to create objects on the printer. The resulting method improves upon circularity of the additively printed object and reduces the use of support material by significant margins.

The system described herein no longer prints in Cartesian coordinates and instead prints using cylindrical coordinates. The bedplate is replaced with a horizontal starter cylinder, called a starter bar, of material upon which 3D printed material is deposited. The starter cylinder rotates in order to allow for material to be placed on all sides of the cylinder. Essentially, the system works much like a lathe, but in reverse. Instead of taking a cylinder and slowly removing material as the cylinder spins, the disclosed system adds material as the cylinder rotates. The resulting additive lathe allows for easy minting of objects such as spheres, vases, screws, nozzles, and more without the need of support material (unless dissolvable support material is desired). Also, the starter bar can be made of many different materials for adding strength to the finished product. Removal is easy as a clamp is released that holds the starter bar. Much higher circularity is achieved as a cylindrical-coordinate printer is used to mint on a rounded surface.

FIG. 3 illustrates respective views of the motor rig 100 in a sample embodiment. FIG. 3A illustrates a top view; FIG. 3B illustrates a perspective view; FIG. 3C illustrates a side view; and FIG. 3D illustrates a right end view. The motor rig 100 supports the whole system described herein. As illustrated, the motor rig 100 it is made up of four main axis steppers including a theta axis stepper and housing 1 that controls motion in the theta (Θ) direction of rotation around the starter bar 6, two R axis steppers and housings 2 that control motion in the radial direction (R) from the starter bar 6, and a Z axis stepper and housing 3 that controls motion in the z-axis (Z) direction or distance along the starter bar 6. The theta axis stepper 1 holds the chuck 4 about a threaded adapter hub 5 and clamps the starter bar 6. The starter bar 6 is supported on the other end by a dead center head 7 and dead center mount 8 that is adjustable and fastened into place along a guide bar 19. The R axis is driven by two evenly matched R axis steppers 2 that are each connected to a threaded lead screw 13 that drives the extruder carriage 20 up and down. A smooth bar 14 is provided on the other end of the extruder carriage 20 for stability. The tops of the threaded lead screw 13 and smooth bar 14 are supported by a cap 16 to limit vibrational motion. The extruder head base 10 of extruder carriage 20 is moved by end bar 11 with free spinning pulley 23 and end bar 12 with pulley 24 driven by the Z axis stepper 3 along two sliding bars 21 using a belt 22. The end bars 11, 12 each have a threaded cap 26 and a flexible coupling 15 on the bottom to drive upward motion and balance. The smooth bar 14 also includes a support 17 to enhance stability. The right end bar 12 also contains a limit switch 18 for the Z axis stepper motor 3 for the pulley system. The Z axis stepper motor 3 is attached to Z axis pulley 24 that drives the motion of the extruder head base 10 along the two sliding bars 21. As the Z axis stepper motor 3 steps, it pulls the extruder head 9 in extruder head base 10 along the Z axis direction of the starter bar 6. The other end of the belt 22 is on free spinning pulley 23 in tension.

Figure 4A:
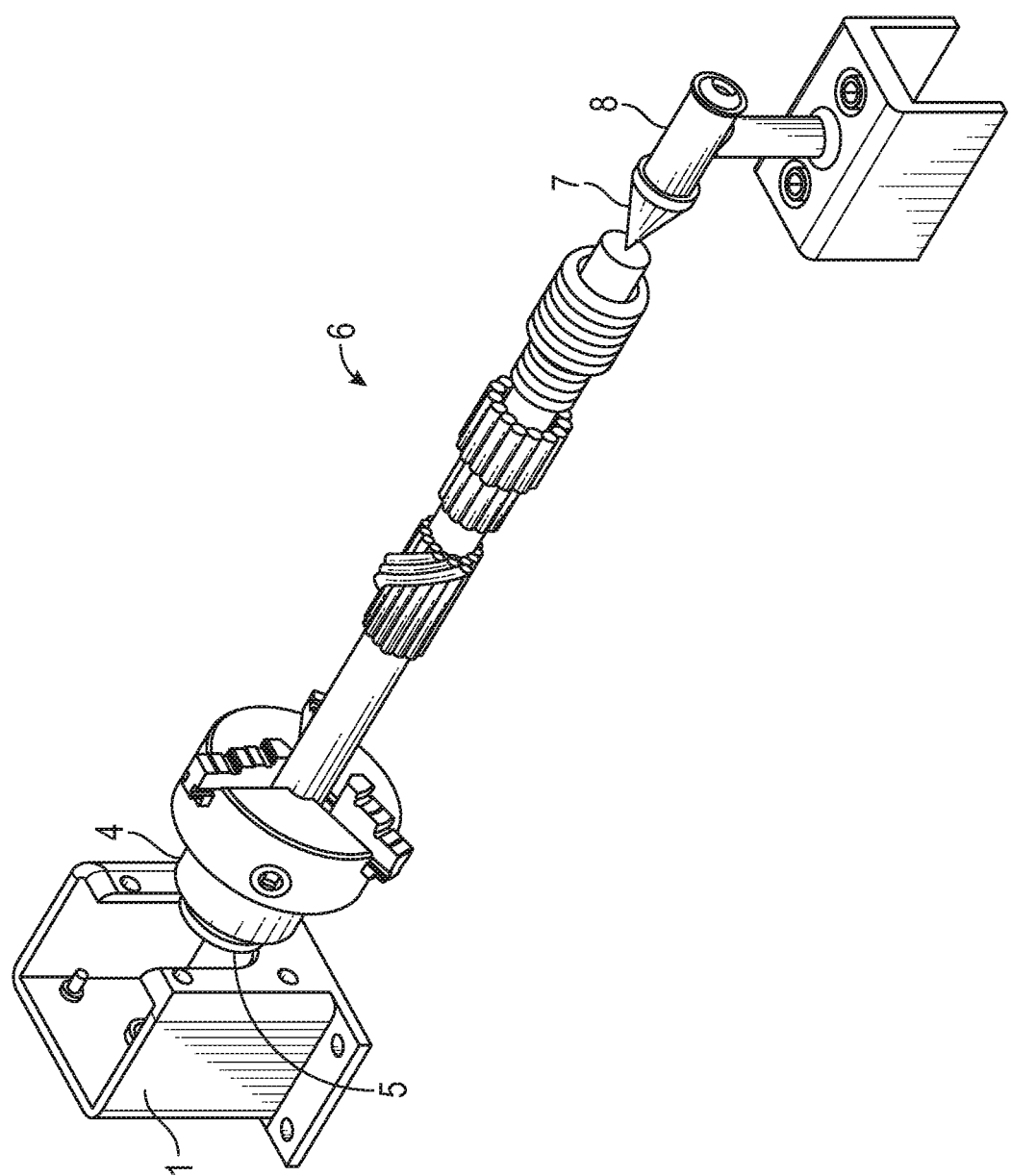
FIG. 4A illustrates a perspective view and FIG. 4B illustrates a side view.
Figure 4B:
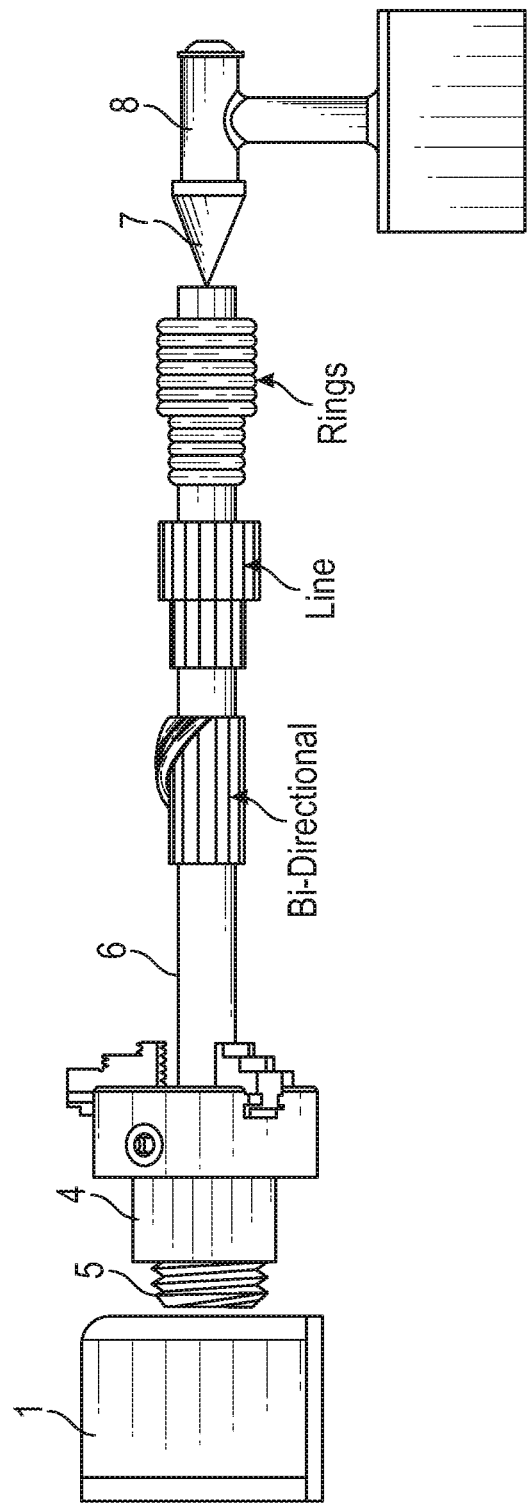

FIG. 4 illustrates respective views of the starter bar 6. FIG. 4A illustrates a perspective view and FIG. 4B illustrates a side view. The starter bar 6 is a blank of round stock of varied diameter that the machine rig 100 holds in place as the extruder 9 adds material line by line. The starter bar 6 can be used as a strengthening core for the part or the starter bar 6 can be altered in post printing or it can be removed. Removal is done either through dissolving methods or using a peel away slip or sleeve over the starter bar 6 (with a material similar to painter's tape) beneath the part. Once the part is finished, the sleeve is slid off the starter bar 6 and peeled out of the part leaving a smooth inner section.

As best shown in FIG. 4A, the starter bar is held by theta axis stepper 1, chuck 4, threaded adaptor hub 5, and dead center 7, 8. Initially, the starter bar 6 is a blank of round stock and is made of a variety of material including but not limited to thermoplastics or metal stock. The starter bar 6 may be covered in a sleeve material to allow the starter bar 6 to be slipped out and easily removed from the created part. To support the starter bar 6, the starter bar 6 is clamped into adjustable chuck 4 that applies radial symmetry clamping to hold the starter bar 6 and/or a blank for working. The adjustable chuck 4 is attached to the theta axis stepper motor 1 with threaded adaptor hub 5. The adjustable chuck 4 may include jaws, a threaded drill head, and vacuum suction to secure the material for working. The other end of the starter bar 6 is supported by adjustable dead center 7, 8, which is a workpiece supporting device that ensures concentricity and dampens vibration with a fixed (dead) or rotating (live) end. A cup center, grip center, or a spring center may also be used. Alternatively, the starter bar 6 may be held in place using a collet-radial symmetry clamping mechanism that holds objects e.g., blanks) in place for working using collar compression.

As explained below, the starter bar 6 enables printing of patterns for a part such as bi-directional, line, and ring patterns on the starter bar 6 as shown. To create a ring, layers of the part are created by the extruder head 9 incrementing around the theta axis then stepping in the Z axis and finally in the R direction. The line method is made by the extruder head 9 incrementing around the Z axis then stepping in the theta direction and finally in the R direction. The last illustrated method creates the first layer using the line method and then creates the second layer bidirectionally. This means that the steppers are moving in the theta direction and the Z direction at the same time to create a curve about the starter bar 6, similar to a thread.

Figure 5:
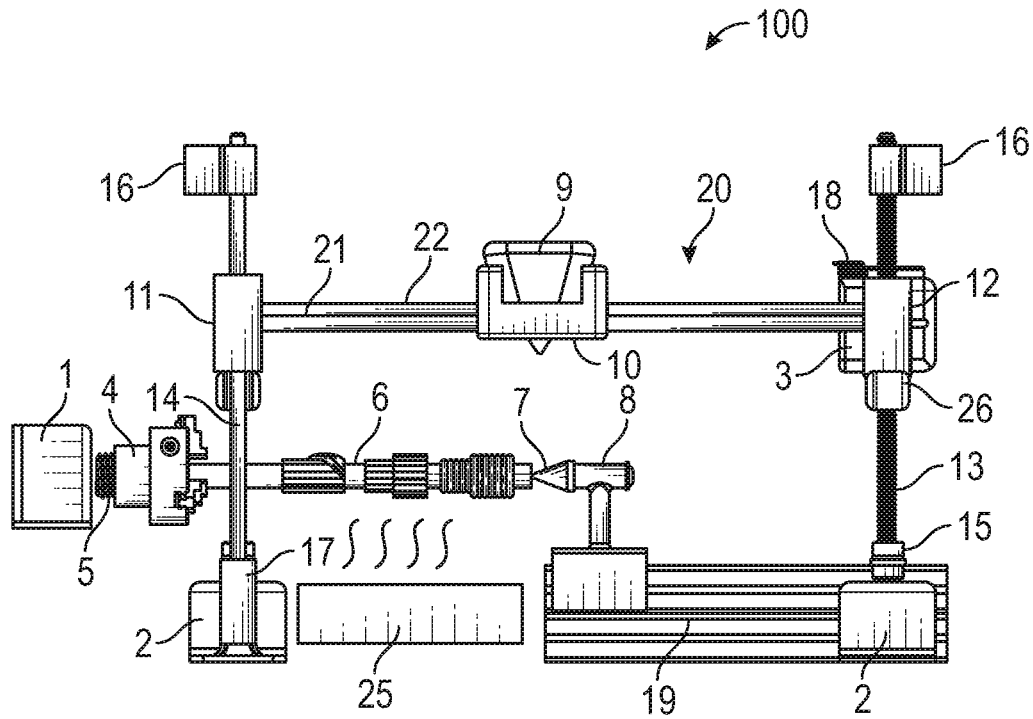
FIG. 5 illustrates the finishing process applied to the motor rig.

FIG. 5 illustrates the finishing process applied to the motor rig 100. The finishing process is an internal mechanism to create a smooth outer finish on printed parts while still in the printer. In this embodiment, the finishing process includes placing a heating device such as a heating unit or vapor bath 25 beneath the starter bar 6. Once in place, the starter bar 6 is slowly rotated by the theta stepper motor 1 above the heating device 25 to produce an even finish.

Post-processing allows users to add a heightened aesthetic finish to their part. The setup of the clamping method and starter bar 6 offers the chance to finish parts while they are still in the additive lathe 100 by using a heating and vapor method. Placing a heating component or vapor bath under a rotating part as shown in FIG. 5 allows an even finish of the part in a contained space.

Components Slicer

The motion of a 3D printer is driven by a series of motion commands known as G-code. To generate this G-code, a slicer program is utilized. Slicer programs take in three dimensional parts, designed in other computer aided design programs as input. The program then segments the part into layers and generates a path for the extruder to follow. Whereas conventional 3D printers print layers on an x-y plane, one layer created by the additive lathe described herein is a cylindrical shell a set radial distance from the Starter Bar. As the present system uses cylindrical coordinates for motion rather than the Cartesian coordinates of other systems, the G—code is modified to provide instructions in cylindrical coordinates. In particular, the output G-code is modified to give motion directions in cylindrical coordinates: R—Radial distance from the starter bar; Theta (Θ)—Rotation about the starter bar; and Z—Distance along the bar. Conversions from X-Y coordinates to cylindrical coordinates are well-known to those skilled in the art and thus will not be described herein.

Clamping Mechanism

The starter bar 6 is secured in the chuck 4 that is mounted on the theta axis stepper motor 1 that is incrementally rotated to each location of the theta coordinate. This holding method offers an adjustable holding size and pressure for a variety of starter bars 6. The opposite end of the starter bar 6 is supported by a dead center 7, 8 that was moved into location and fastened down for the duration of the print to ensure a sufficient level of alignment.

Electronics and Motion Rig

The electronics used to control the additive lathe 100 include controls for various stepper motors, a user interface, a file transfer reader (such as an SD card reader), and code to drive the extruder head 9. In sample embodiments, a microcontroller as shown in FIG. 6 is used to control the steppers to provide cylindrical motion of the device.

Operation

Cylindrical coordinates are used to enable and optimize the creation of certain 3D parts in sample embodiments. For this purpose, additive lathe 100 is made up of three parts: a custom slicer, a printer, and a finishing device. The slicer program takes in stereolithography tiles created in other computer-aided design programs and generates toolpaths, or G-Code, for cylindrical motion (in R, Θ, and Z coordinates). Other files types include .obj and AMF but these formats are generally used in backend applications. This G-Code is then saved and transferred to the printer using an SD card or similar device.

Figure 6:
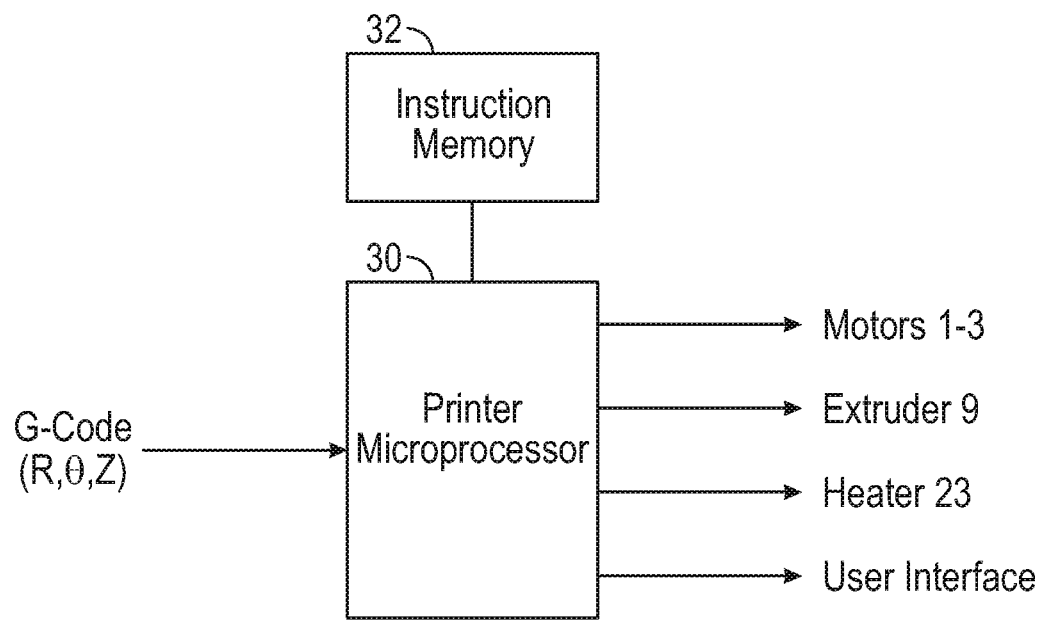
FIG. 6 illustrates the printer microprocessor for controlling the respective axis motors and the finishing heater.

The printer including additive lathe 100 takes in and reads the G-Code via a microprocessor 30 (FIG. 6). The microprocessor 30 drives various motors, heating controls, and a user interface of the printer in accordance with instructions received from memory 32. As noted above, the stepper motors driven by the microprocessor 30 include two R axis steppers 2 attached to a threaded lead screw 13 that drives the extruder carriage 20 up and down with respect to the starter bar 6 to allow variable distances from the starter bar 6. A theta axis stepper 1 drives the rotation of the chuck 4 holding the starter bar 6, enabling movement in the Θ direction. The Z motion is achieved by the Z axis stepper motor 3 that drives the pulley and belt system 22, 23, 24 to incrementally pull the extruder head 9 and extruder housing 10 back and forth along rails 21. A final stepper is contained within the extruder head, controlling material flow and purging.

As noted above, the additive lathe 100 prints material onto a round blank of stock, or starter bar 6, held in place by the chuck 4. The starter bar 6 can be made of a variety of materials such as metals or thermoplastics to be used as a core to the part, dissolvable material that can be washed away, or a removable sleeve. The removable sleeve is placed over the starter bar 6, which can be slid off and peeled off the part.

It will be appreciated by those skilled in the art that the motor rig 100 allows for many types of movement that were not possible in Cartesian-based systems. As noted above, three key simplistic motions include line, ring, and bidirectional. For the line method, the extruder 9 lays material along the bar in the Z axis direction incrementally moving in the theta direction after each line is complete. Once a full rotation is completed, the extruder 9 is moved up one increment in the R direction and the next layer is printed. On the other hand, the ring method completes a full revolution about the bar in the theta direction and then incrementally moves over in the Z direction. Once a full rotation is completed, the extruder 9 is moved up one increment in the R direction and prints the next layer. Finally, the printer can additionally create bidirectional layer patterns by moving in the Z and theta directions at the same time. Each of these methods can be used intermixed between and within parts as set in the slicing program by the user.

Once the part has been created, the starter bar 6 with the part on it can be put through the post-processing finishing mechanism, if desired. This is used to create a smooth outer surface on the part. This is done by rotating the part around the Φ axis while over a heating unit or vapor bath 25 directly below the starter bar 6 to create a smooth surface by melting or chemical reaction as shown in FIG. 5. When this process is complete, the starter bar 6 is removed. The starter bar 6 if it is used as a core can be trimmed or additional machining could be done if desired. Alternatively, a dissolvable bar can be dissolved or a sleeve can be slid off and peeled out of the part leaving a smooth inner ring. The part is now complete.

In summary, the additive lathe described herein is an additive manufacturing device that utilizes the advantages of cylindrical coordinates to produce parts with higher circularity, smoother finish and shorter print time. Users may take parts they have created in computer aided programs and slice them into cylindrical coordinates. The printer is then able to layer material onto a rotated starter bar 6 to build up the parts driven by a microcontroller and G-code. The starter bar 6 can be used as a core to the part or removed as desired. Finally, the user can opt to run an internal finishing method to smooth the outer surface of the part using a heating device 25.

Those skilled in the art will appreciate that the G-Code and printer element controls described herein with respect to FIG. 6 may be developed using appropriate computing resources (e.g., one or more processors 30) and memory resources (e.g., memory 32) that store software including instructions for implementing the cylindrical coordinate 3D printing methods described herein. Memory 32 for storing instructions for implementing the methods described herein may comprise Random Access Memory (RAM), and semiconductor memory devices, which may include, in some embodiments, storage locations in semiconductors such as registers. Specific examples of static memory include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

One or more machines implementing the additive lathe described herein may further include a display device, an input device (e.g., a keyboard), and a user interface (UI) navigation device (e.g., a mouse). In an example, the display device, input device, and UI navigation device may be a touch screen display. The one or more machines may additionally include a mass storage (e.g., drive unit), a signal generation device (e.g., a speaker), a network interface device, and one or more sensors for collecting data. The one or more machines may include an output controller, such as a serial (e.g., universal serial bus (USB), parallel, or other wired or wireless (e.g., infrared (IR), near field communication (NEC), etc.) connection to communicate or control one or more peripheral devices (e.g., a printer, card reader, etc.). In some embodiments, the processor and/or instructions may comprise processing circuitry and/or transceiver circuitry.

In sample embodiments, the storage device 32 may include a machine-readable medium on which is stored one or more sets of data structures or instructions (e.g., software) embodying or utilized by any one or more of the techniques or functions described herein. The instructions may also reside, completely or at least partially, within the main memory, within static memory, or within the hardware processor 30 during execution thereof by the printer. In an example, one or any combination of the hardware processor, the main memory, the static memory, or the storage device may constitute machine readable media. Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks. While the machine-readable medium is generally a single medium, the term "machine readable medium" may include a single medium or multiple media (e.g., a centralized or distributed database, and/or associated caches and servers) configured to store the one or more instructions.

An apparatus of the machine(s) implementing the additive lathe described herein may include one or more of a hardware processor (e.g., a central processing unit (CPU), a graphics processing unit (GPU), a hardware processor core, or any combination thereof), a main memory, and a static memory, sensors, network interface device, antennas, a display device, an input device, a UI navigation device, a mass storage, instructions, a signal generation device, and an output controller. The apparatus may be configured to perform one or more of the methods and/or operations disclosed herein. The apparatus may be intended as a component of the machine to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by one or more machines and that cause the one or more machines to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine-readable media. As used herein, "machine readable media" excludes a transitory propagating signal.

The instructions may further be transmitted or received over a communications network using a transmission medium via a network interface device utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., institute of Electrical and Electronics Engineers (IEEE) 802.11 family of standards known as IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, a network interface device may include one or more physical jacks (e.g., Ethernet, coaxial, or phone jacks) or one or more antennas to connect to a communications network. In an example, a network interface device may include one or more antennas to wirelessly communicate using at least one of single-input multiple-output (SIMO), multiple-input multiple-output (MIMO), or multiple-input single-output (MISO) techniques. In some examples, the network interface device may wirelessly communicate using Multiple User MIMO techniques. The term "transmission medium" shall be taken to include any intangible medium that is capable of storing, encoding or carrying instructions for execution by the machine, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

The systems and methods described herein are captured within the scope of the following claims. It is understood by those skilled in the art that the claims encompass specific embodiments as well as embodiments that are not specifically described herein but which may include equivalent components and steps to those described herein as well as other features and modifications that would be apparent to those skilled in the art.

What is claimed is:
1. A method for additive printing, comprising:
   placing a blank of round stock into a motor rig having a theta axis stepper that controls rotation of the blank around a theta axis;
   applying extruder material to the blank under control of a z axis stepper and at least one radial axis stepper that together control movement of an extruder in a z axis direction and a radial axis direction along the blank as the blank is rotated by the theta axis stepper; and controlling operation of the theta axis stepper, z axis stepper and at least one radial axis stepper to apply the extruder material to the blank in a cylindrical pattern provided in cylindrical coordinates to create a part.

2. A method as in claim 1, further comprising covering the blank in a sleeve material prior to applying the extruder material and removing the sleeve from the blank once the part comprising the cylindrical pattern has been completed.

3. A method as in claim 1, wherein the cylindrical pattern includes a ring and controlling operation of the theta axis stepper, z axis stepper and at least one radial axis stepper to apply the extruder material to the blank comprises incrementing the theta axis stepper to rotate around the theta axis, then incrementing the z axis stepper to move in steps in the z axis direction, and then incrementing the at least one radial axis stepper a step in the radial axis direction as the extruder material is applied to the blank.

4. A method as in claim 1, wherein the cylindrical pattern includes a line and controlling operation of the theta axis stepper, z axis stepper and at least one radial axis stepper to apply the extruder material to the blank comprises incrementing the z axis stepper to move in steps in the z axis direction, then incrementing the theta axis stepper to rotate in steps around the theta axis, and then incrementing the at least one radial axis stepper a step in the radial axis direction as the extruder material is applied to the blank.

5. A method as in claim 1, wherein the cylindrical pattern includes a bidirectional pattern and controlling operation of the theta axis stepper, z axis stepper and at least one radial axis stepper to apply the extruder material to the blank comprises simultaneously incrementing the theta axis stepper to move in steps around the theta axis and the z axis stepper to move in steps in the z axis direction to create a curved extrusion layer about the blank.

6. A method as in claim 1, further comprising rotating the part over a heating device to create a smooth outer finish on the part before the part is removed from the blank.

7. An additive lathe comprising:
a blank of round stock;
an extruder;
a motor rig having a theta axis stepper that controls rotation of the blank around a theta axis, a z axis stepper that controls movement of the extruder in a z axis direction, and at least one radial axis stepper that controls movement of the extruder in a radial axis direction along the blank as the blank is rotated by the theta axis stepper; and
a processor that controls operation of the theta axis stepper, z axis stepper, at least one radial axis stepper, and extruder to apply extruder material to the blank in a cylindrical pattern provided in cylindrical coordinates to create a part.

8. The additive lathe of claim 7, wherein the blank is formed of thermoplastics or metal stock.

9. The additive lathe of claim 7, wherein the blank is formed of a dissolvable material.

10. The additive lathe of claim 7, further comprising a sleeve placed over the blank and beneath any applied extruder material, the sleeve adapted to facilitate removal of the part from the blank once the part has been completed.

11. The additive lathe of claim 7, further comprising a heating device disposed adjacent to the blank to apply heat to the extruder material as the blank is rotated by the theta axis stepper around the theta axis so as to create a smooth outer finish on the part before the part is removed from the blank.

12. The additive lathe of claim 7, further comprising an extruder carriage holding the extruder, wherein the extruder carriage is disposed on two sliding bars and adapted to move in the z axis direction using a pulley system controlled by the z axis stepper.

13. The additive lathe of claim 12, wherein the extruder carriage is supported by the at least one radial axis stepper and connected to a lead screw that drives the extruder carriage up and down in the radial axis direction.

14. An additive lathe comprising:
a blank of round stock;
an extruder;
a motor rig having a theta axis stepper that controls rotation of the blank around a theta axis, a z axis stepper that controls movement of the extruder in a z axis direction, at least one radial axis stepper that controls movement of the extruder in a radial axis direction along the blank as the blank is rotated by the theta axis stepper, and an adjustable chuck attached to the theta axis stepper that holds the blank for working by applying radial symmetry clamping, the adjustable chuck including jaws, a threaded drill head, and vacuum suction to secure the blank for working; and
a processor that controls operation of the theta axis stepper, z axis stepper, at least one radial axis stepper, and extruder to apply extruder material to the blank in a cylindrical pattern provided in cylindrical coordinates to create a part.

15. The additive lathe of claim 14, further comprising a supporting and centering device comprising an adjustable dead center that supports the blank at an end of the blank opposite said adjustable chuck and ensures concentricity and dampens vibration with a fixed (dead) or a rotating (live) end.

16. The additive lathe of claim 7, wherein the motor rig comprises a collet-radial symmetry clamp that holds the blank in place for working using collar compression.

17. A 3d printer comprising the additive lathe of claim 7.

* * * * *